United States Patent [19]
Nonaka et al.

[11] Patent Number: 5,408,596
[45] Date of Patent: Apr. 18, 1995

[54] APPARATUS FOR DISPLAYING MULTIDIMENSIONAL INFORMATION

[75] Inventors: Hisanori Nonaka, Hitachi; Yasuhiro Kobayashi, Katsuta, both of Japan

[73] Assignee: Hitachi, Ltd., Tokyo, Japan

[21] Appl. No.: 810,128

[22] Filed: Dec. 19, 1991

[30] Foreign Application Priority Data

Dec. 20, 1990 [JP] Japan .................. 2-404087

[51] Int. Cl.[6] .................. G06F 15/419; G06F 15/62
[52] U.S. Cl. .................. 395/140; 395/119; 395/127; 364/578; 364/148
[58] Field of Search .......... 395/119, 140, 127, 161; 364/148, 154, 188, 468, 402, 401, 578

[56] References Cited

U.S. PATENT DOCUMENTS

| | | | |
|---|---|---|---|
| 4,344,145 | 8/1982 | Chasek | 395/140 X |
| 4,675,147 | 6/1987 | Schaefer et al. | 395/140 X |
| 4,937,743 | 6/1990 | Rassman et al. | 364/401 |
| 5,136,497 | 8/1992 | Coe et al. | 364/578 X |
| 5,150,457 | 9/1992 | Behm et al. | 395/140 X |
| 5,228,119 | 7/1993 | Mihalisin et al. | 395/119 X |
| 5,307,455 | 4/1994 | Higgins et al. | 395/140 |

FOREIGN PATENT DOCUMENTS 1-273102  1/1989  Japan .

Primary Examiner—Raymond J. Bayerl
Attorney, Agent, or Firm—Antonelli, Terry, Stout & Kraus

[57] ABSTRACT

In order to display the value of a multivariable function at at least one point around an arbitrary point which exists in a multidimensional space defined as a domain of the multivariable function, a display plane is divided into a plurality of regions, the plurality of regions are brought into correspondence with a plurality of quadrants which have the arbitrary point in the multidimensional space as a common vertex, respectively, and the value of the multivariable function at a point on the quadrant existent around the arbitrary point is displayed at the position of that point on the region which corresponds to the quadrantal point. The incremental or decremental situation of the values of the multivariable function around the arbitrary point in the multidimensional space can be visually expressed by a single plan view. The multidimensional information displaying method can be utilized for the verification of the result of an optimizing computation, and in turn, for example, for the optimum control of a system.

9 Claims, 17 Drawing Sheets $X = \sqrt{X1^2 + X2^2} \cdot \cos(\varphi' + \theta') \cdot C$ $Y = \sqrt{X1^2 + X2^2} \cdot \sin(\varphi' + \theta') \cdot C$ $\varphi' = \dfrac{2\varphi}{\pi}$ $\theta' = (n[X1,X2] - 1) \cdot \theta$ $\varphi = \tan^{-1} \dfrac{X2}{X1}$

N : TOTAL NUMBER OF QUADRANTS n[A,B] : SERIAL NO. GIVEN TO QUADRANT [A,B]

C : COEFFICIENT FOR NORMALIZATION

APPARATUS FOR DISPLAYING MULTIDIMENSIONAL INFORMATION

BACKGROUND OF THE INVENTION

The present invention relates to a method of and an apparatus for displaying multidimensional information. More particularly, it relates to a multidimensional information displaying method and a multidimensional information displaying apparatus which are well suited for displaying the results of optimizing computations of optimum control, the optimum design, etc.

As to prior art methods of displaying multidimensional information, there have been contrived a radar chart, facial graph, a constellation graph, etc. (Chernoff's KEIRYO KANRI "(Metering Administration)", Vol. 36, No. 12, pp. 9–12, 1987). Also, a method of displaying multidimensional information afforded as the attribute of a polygonal line has been known from R. M. Pickett, G. G. Grinstein: "Iconographic Displays for Visualizing Multidimensional Data", Proc. IEEE, Int. Conf. Syst. Man. Cybern., pp. 514–519, 1988. With any of these methods, a plurality of information items in which one point or two or more points has/have as its/their attribute can be expressed. With, for example, the facial graph, a plurality of information items concerning one point are quantitatively expressed in terms of the size and inclination of eyes, the profile of a face, etc. by the use of the simplified picture of the face.

Incidentally, the word "multidimensional" is intended to generally mean "of two or more dimensions".

Although each of the prior-art methods of displaying multidimensional information can express a plurality of information items possessed by a finite number of points, it cannot express the situation of the continuous variation of information in a multidimensional space. By way of example, in a case where the incremental or decremental situation of the values of a multivariable function around an arbitrary point in the multidimensional space is to be displayed, it is difficult to directly apply the multidimensional information displaying method in the prior art. For this reason, there has heretofore been adopted a technique wherein the multidimensional space is cut by straight lines or planes containing the arbitrary point, and wherein the situations of the variations of the functional values in the resulting sections are depicted (refer to, for example, the official gazette of Japanese Patent Application Laid-open (KOKAI) No. 273102/1989).

With this technique, however, when the multidimensional space is cut by the planes each being held between two coordinate axes, the number of the planes becomes nC2 where n denotes the number of coordinate axes. For n=100, accordingly, as many as 4950 separate plan views are required, which obstructs a user in intuitively grasping the incremental or decremental situation of the functional values in the multidimensional space.

SUMMARY OF THE INVENTION

The present invention has for its object the elimination of the drawback as stated above, and to provide a multidimensional information displaying method and a multidimensional information displaying apparatus which are useful for intuitively grasping the incremental or decremental situation of functional values in a multidimensional space.

The multidimensional information displaying method of the present invention consists of a method of displaying values of a multivariable function at a plurality of points around an arbitrary point which exists in a multidimensional space defined as a domain of the multivariable function. This display method is characterized by comprising the division of a display plane into a plurality of regions, bringing the plurality of regions into correspondence with a plurality of quadrants which have the arbitrary point in the multidimensional space as a common vertex thereof, and displaying the values of the multivariable function at points on each of the quadrants existent around the arbitrary point, at positions on the respective region which corresponds to the points on the quadrant.

Preferably, the display plane is divided into the plurality of regions by a plurality of lines which stretch radially from the arbitrary point.

The display of the values of the multivariable function is presented by, for example, displaying indexes at the positions where the functional values of the corresponding points are at regular intervals. Preferably, each of the indexes indicates a varying direction of each functional value.

Alternatively, the display of the values of the multivariable function can be presented by changing a display color in accordance with the magnitude of the value.

The correspondence between the regions and the quadrants should desirably be so established that the two regions which correspond respectively to the two quadrants sharing an identical axis in the multidimensional space adjoin each other. To this end, an algorithm for obtaining an Eulerian closed path can be utilized.

From another viewpoint, the multidimensional information displaying method of the present invention consists of a method of displaying a varying situation of values of a multivariable function around an arbitrary point which exists in a multidimensional space defined as a domain of the multivariable function; characterized by comprising the first step of computing functional values of a plurality of points on quadrants which have the arbitrary point as a common vertex thereof; and the second step of displaying the varying situation of the functional values on the quadrants by means of an output device on the basis of computed results of the first step.

At the second step, by way of example, a circle is depicted on the output device, which is divided around its central point to generate a plurality of sectors, and the varying situation of the functional values on the quadrants is displayed on the generated sectors.

The varying situation of the functional values on the quadrants can be expressed by a number of methods including the use of contour lines, change in display colors, a three dimensional mesh diagram, and a bird's eye view.

The multidimensional information displaying apparatus of the present invention consists of a storage device which stores a program for generating image data by the use of any of the multidimensional information displaying methods described above, a formula of a multivariable function, and coordinates of an arbitrary point in a multi dimensional space; a central processing unit which executes the program to generate the image data; and a video output device which displays a picture on the basis of the generated image data.

The system of the present invention for verifying a result of a nonlinear optimization computation consists of a nonlinear optimization computation apparatus which evaluates an optimum solution of a given multivariable function, and then the varying situation of the multivariable function around this optimum solution is displayed by the multidimensional information displaying apparatus. The verification system also comprises input means with which an operator inputs information for determining a display range, whereby the operator adjusts the display range in dialogic fashion so as to acknowledge whether or not the evaluated solution is a saddle point and whether or not there is any other solution which is close to the evaluated solution.

The system of the present invention for optimizing a multivariable function consists of input means for appointing coordinates of an arbitrary point in a multidimensional space, and the multidimensional information displaying apparatus which displays a varying situation of the multivariable function around the point given by the input means. When an operator has appointed the coordinates of the point through the input means, the multidimensional space display with its central point at these coordinates is presented, and the operator alters the coordinates of the central point with reference to the result so as to finally obtain coordinates which give a desired functional value.

The optimum control system of the present invention consists of means for expressing a multivariable function whose input variables are controlled variables of a controlled system, the multivariable function optimizing system which optimizes the multivariable function, and means for executing a control on the basis of a result of the optimization.

The optimal resource allocation system of the present invention consists of a system whose throughput is determined depending upon the projection rates of a plurality of resources. The system is characterized by having means for expressing the throughput in terms of a multivariable function whose input variables are projection rates of the plurality of resources, the multivariable function optimizing system which maximizes a value of the multivariable function; and means for outputting that allocation of the resources which maximizes the throughput, on the basis of a result of the optimization.

The multidimensional quadrant developing method of the present invention consists of a method wherein $4 \times nC2$ quadrants which have an arbitrary point in an n-dimensional space (where n denotes the number of dimensions being an integer of at least 2) as a common vertex thereof are developed on a display plane; characterized by dividing the display plane into a plurality of regions with $4 \times nC2$ lines which stretch radially from the arbitrary point, and bringing the plurality of regions into correspondence with the plurality of quadrants which have the arbitrary point in the multidimensional space as a common vertex thereof that the two regions which correspond respectively to the two quadrants sharing an identical axis in the multidimensional space adjoin each other.

The control parameter determining equipment of the present invention consists of equipment for determining a control parameter of a system, on the basis of a system input parameter (and a feedback parameter detected in the system), and the multidimensional information displaying apparatus which verifies propriety of the control parameter.

In operation, according to the present invention, all quadrants which have an arbitrary point in a multidimensional space as their common vertex can be developed on a single plane without regard to the number of dimensions, and besides, any point on each of the quadrants can be brought into correspondence with a point within a corresponding region on the plane. Accordingly, multidimensional information items can be depicted in a single plan view in such a way that the values of a multivariable function at those points on the individual quadrants which exist around the arbitrary point in the multidimensional space are displayed at the corresponding points within the regions mating with the quadrants to which the quadrantal points belong. As a result, an operator is permitted to intuitively grasp the incremental or decremental situation of the functional values around the arbitrary point in the multidimensional space.

As expedients for displaying the functional values, there are considered a display based on contour lines, a display based on changes of colors (including gradation levels), and a three dimensional display on a plane making use of, e. g., three dimensional meshes or a bird's eye view. Further, when stereoscopic display means capable of controlling the ruggedness of a surface is utilized, a stereoscopic display is possible in which the rugged parts conforming to the functional values are formed in the surface.

The correspondence between the regions and the quadrants is established such that the two regions which correspond respectively to the two quadrants sharing an identical axis in the multidimensional space adjoin each other. Thus, the contour lines become continuous at the boundary of the divided regions on the display plane, so that the grasp of the incremental or decremental situation of the functional values is facilitated.

The present invention is useful for finding the combination of input variable values with which the value of the multivariable function becomes a minimum or maximum. It is applicable to the optimum control of a plant, the optimum designs of a machine, a system etc., and other various kinds of optimization.

Using the present invention, the incremental or decremental situation of the values of the multivariable function around the arbitrary point in the multidimensional space can be visually expressed by the single plan view. Accordingly, the invention is applicable to interfaces for a method of and an apparatus for verifying the result of an optimizing computation, and for an optimal resource allocation system of a dialog type.

DETAILED DESCRIPTION OF THE PREFERRED EMBODIMENTS

Hereunder, an embodiment will be described by exemplifying a case where the interior of a sphere of radius 1 (unity), the central point of which is an arbitrary point existing in a multidimensional space (the arbitrary point being the common vertex of quadrants to be described later), is defined as the vicinity of the arbitrary point, and where the varying situation of the values of a multivariable function in the above vicinity is depicted on a plane. A diagram thus depicted shall be called a "multidimensional-spacially developed view" in this specification. By the way, in this embodiment, the multivariable function is the objective function of a nonlinear optimization problem.

Here in this embodiment, individual regions on the plane are assumed to be sectors which are obtained by dividing one circle around the central point thereof. The regions, however, may well be in a shape other than the sectoral shape, for example, in a triangular shape. In other words, it suffices for each of the regions to be formed by a plurality of lines which stretch radially from one point.

Figure 1:
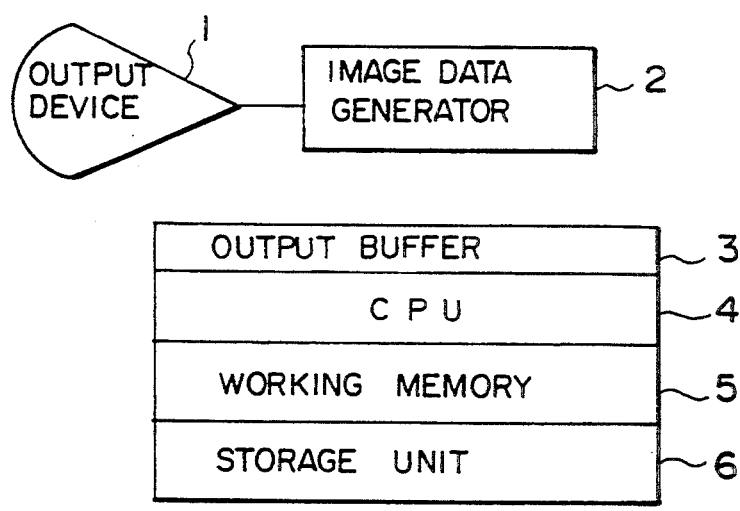
FIG. 1 is a block diagram showing a computer architecture in an embodiment of the present invention.

FIG. 1 shows the computer architecture of a multidimensional information displaying apparatus according to this embodiment. The computer in this embodiment comprises an output device 1 such as a display device or printer, a image data generator 2, an output buffer 3, a CPU (central processing unit) 4, a working memory 5, and a storage unit 6. The working memory 5 corresponds to an internal storage, while the storage unit 6 corresponds to an external storage.

The CPU 4 calls the routines of a multidimensional information displaying program (namely, processing steps shown in FIGS. 2, 3 and 4) from the storage unit 6 into the working memory 5 and executes them in succession, thereby generating elementary graphic data for depicting a multidimensional spacially developed view. The "elementary graphic data" here is, for example, logic information which expresses whether a pixel lying at a specified position on the output device 1 is to be turned "on" or "off". The elementary graphic data is sent through the output buffer 3 to the image data generator 2. The image data is delivered to the output device 1. Then, the output device 1 displays a predetermined figure (multidimensional-spacially developed view) based on the image data items. Incidentally, the elementary graphic data may well contain color information and/or gradation information in addition to, or in place of, the on/off information.

The storage unit 6 stores, at least, <1> the formula of the multivariable function, <2> the coordinates of the arbitrary point in the multidimensional space, and <3> the program for the multidimensional information display. All or some of these data items can also be stored in the working memory 5.

<1> Formula of Multivariable Function:

In this embodiment, the following function is used as an example of the multivariable function F:

$$F=(X1+3 \cdot X2+X3)^2+4 \cdot (X1-X2)^2$$

Here, X1, X2 and X3 denote input variables, and the multivariable function F is a three-variable function. That is, the domain of the function F is a threedimensional space.

Figure 11:
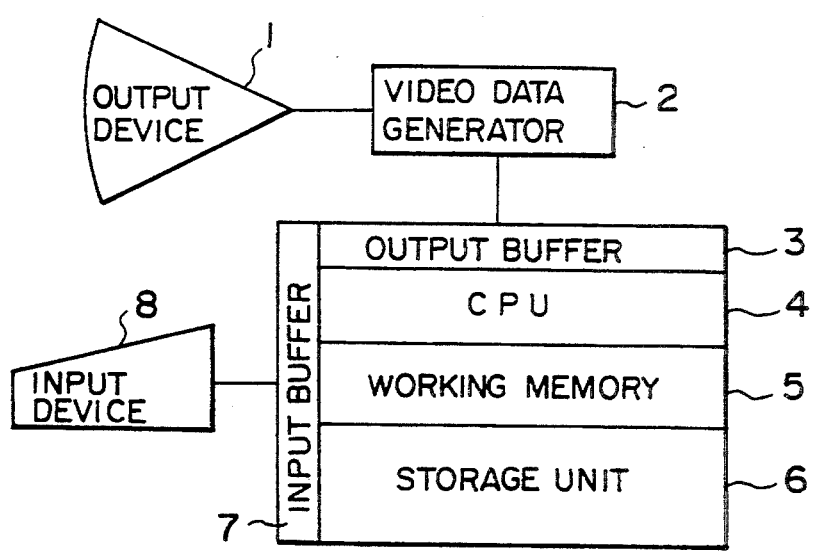
FIG. 11 is a block diagram showing an embodiment of a multidimensional information displaying apparatus according to the present invention.
Figure 12:
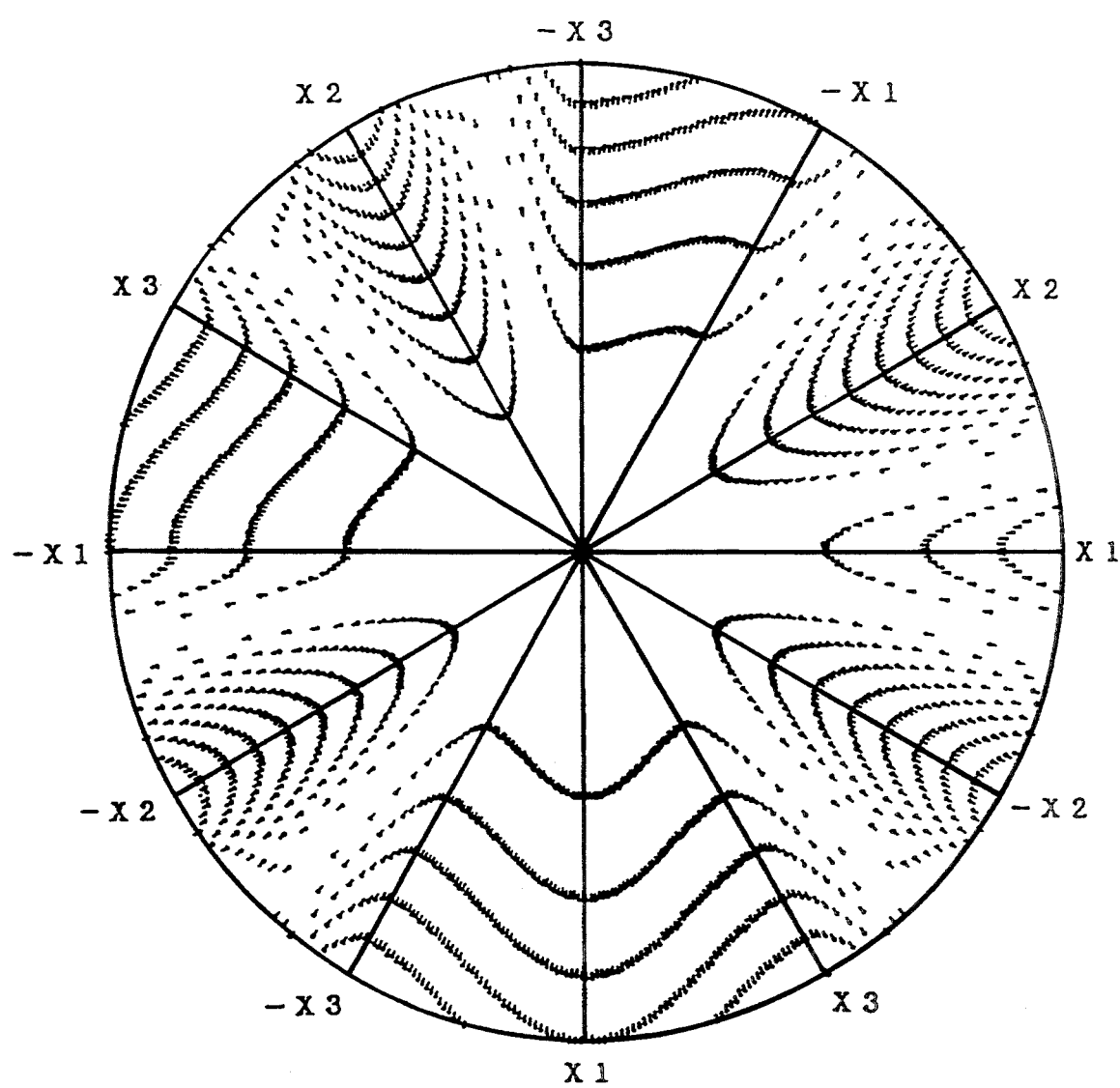
FIG. 12 is a diagram for explaining another example of the multidimensional spacially developed view according to the present invention.

<2> Coordinates of Arbitrary Point in Multidimensional Space (for example, Center of Circle to be Displayed on Output Device 1):

In this embodiment, the arbitrary point is set at A(0, 0, 0). The coordinates of the point A are input from an input device 8 as shown in FIG. 11, by an operator. In a case where this embodiment is applied to a nonlinear optimization system, the point A becomes the coordinate point of the solution of the multivariable function which is an objective function.

Figure 2:
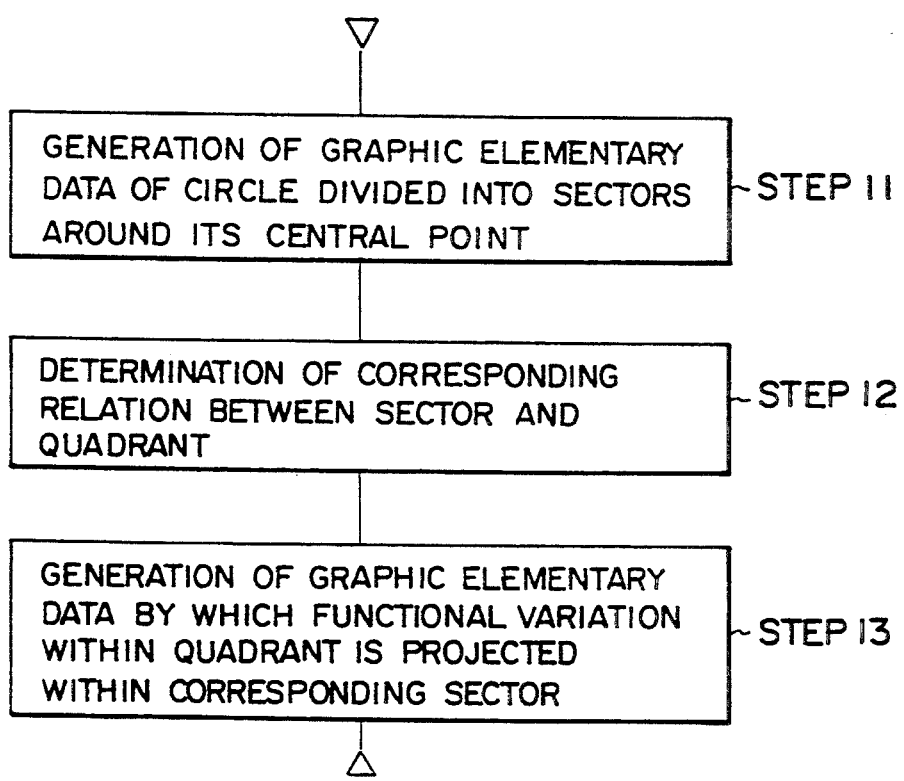
FIG. 2 is a flow chart showing fundamental processing steps for a multidimensional information display according to the present invention.

<3> Multidimensional Information Displaying Program:

The processing contents of the multidimensional information displaying program are shown in FIG. 2. Now, the details of the respective steps will be described.

Figure 3:
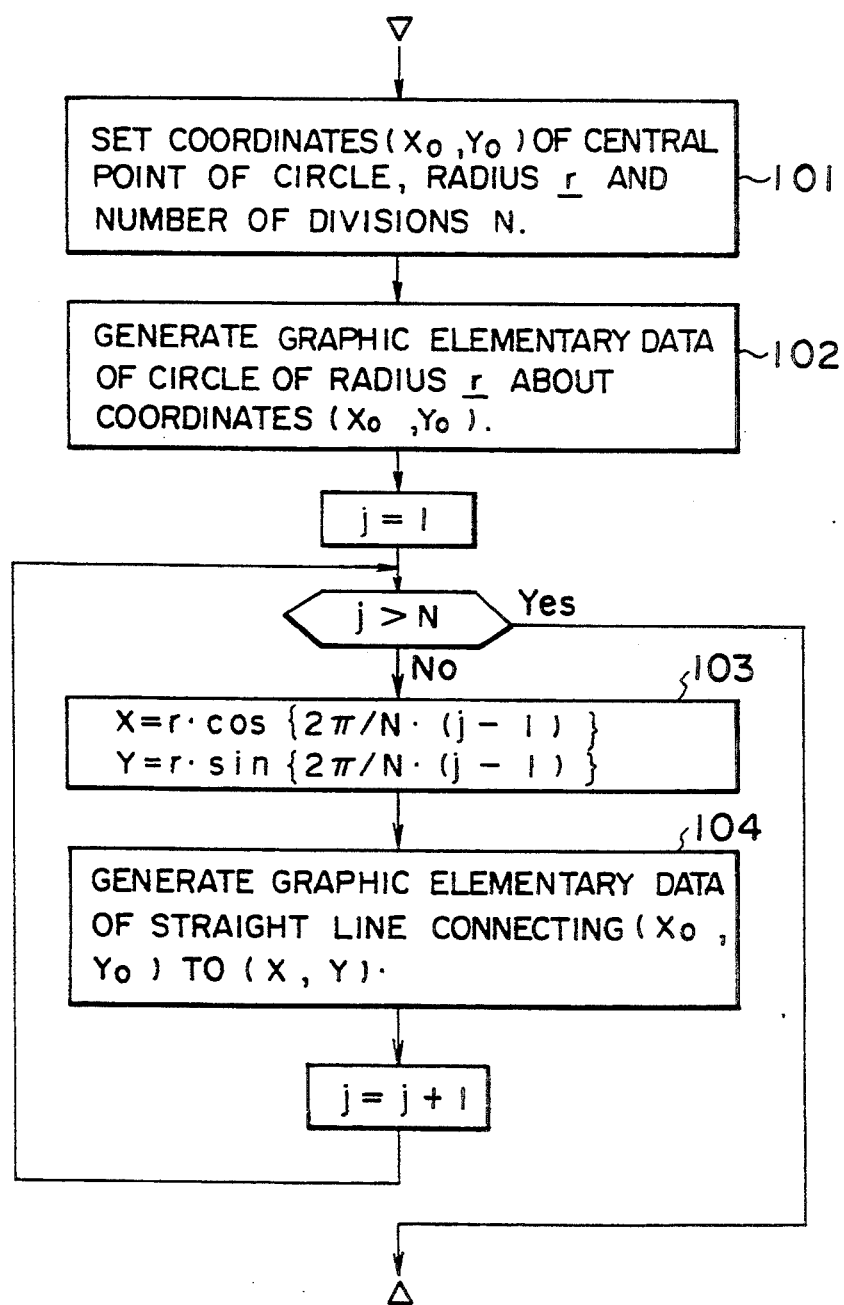
FIG. 3 is a flow chart showing the details of a step 11 in the flow chart of FIG. 2.

(i) Step 11:

This step generates the elementary graphic data for depicting on the output device 1 the diagram in which a circle is divided into a plurality of sectors around its central point. The details of this step are shown in FIG. 3. At a step 101, representing the coordinates of the center of the circle on the output device 1, the radius r of the circle, and the number of divisions N of the circle are input and are stored in the storage unit 6. These data items are input from the input device 8 (FIG. 11) by the operator. It is also possible that the CPU 4 automatically acquires the data items by the use of a predetermined program. At a step 102, the elementary graphic data which turns ON the pixels lying on the circumference of the circle (radius r) is generated on the basis of the data items mentioned above. Subsequently, a step 103 calculates the coordinates of one point on the circumference, and a step 104 generates the elementary graphic data of the segment of a line connecting the center of the circle and the point on the circumference. A plurality of such segments define the sectors.

In this embodiment, the sectors are considered to correspond respectively to quadrants which exist in the vicinity of one point in an n dimensional space (the point given by the coordinates of the foregoing item <2>). Since the number of the quadrants in the n-dimensional space is expressed by $4 \times nC2$, the number of quadrants is 12 in the three dimensional space. All the quadrants in the three-dimensional space will be listed below. In the list, [X1, X2], for example, shall indicate the quadrant which has the point in the n-dimensional space as its vertex and which centers round the point where an axis X1 and an axis X2 intersect.

[X1, X2], [X1, X3],
[X1, -X2], [X1, -X3],
[X2, X3], [X2, -X1],
[X2, -X3], [X3, -X1],
[X3, -X2], [-X1, -X2],
[-X1, -X3], [-X2, -X3]

Figure 6:
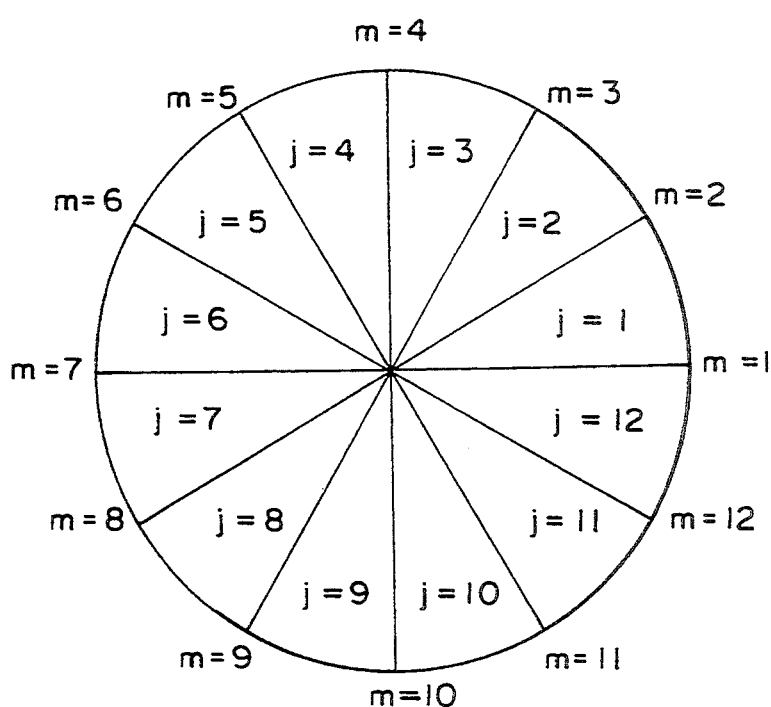
FIG. 6 is a diagram for explaining the aspect of division of a circle for the multidimensional information display according to the present invention.

In this embodiment, with the intention of displaying all the quadrants on the plane at a time, 12 sectors are generated by equally dividing the circle by 12. That is, the sectors and the quadrants correspond in one-to one relationship. Besides, as indicated in FIG. 6, serial Nos. j are given to the respective sectors, and serial Nos. m to the side edge of the sectors.

(ii) Step 12:

This step determines the respectively corresponding relations of the 12 sectors to the quadrants which have the point A in the three dimensional space as their common vertex. Here, it is assumed that the corresponding relations between the sectors and the quadrants and those between the latera of the sectors and the coordinate axes are determined as indicated in Table 1 beforehand. An expedient for bringing the sectors and the quadrants into correspondence will be described later.

TABLE 1

| j | Quadrant | m | Coordinate Axis |
|---|---|---|---|
| 1 | [X1, X2] | 1 | X1 |
| 2 | [X2, −X1] | 2 | X2 |
| 3 | [−X1, −X3] | 3 | −X1 |
| 4 | [−X3, X2] | 4 | −X3 |
| 5 | [X2, X3] | 5 | X2 |
| 6 | [X3, −X1] | 6 | X3 |
| 7 | [−X1, −X2] | 7 | −X1 |
| 8 | [−X2, −X3] | 8 | −X2 |
| 9 | [−X3, X1] | 9 | −X3 |
| 10 | [X1, X3] | 10 | X1 |
| 11 | [X3, −X2] | 11 | X3 |
| 12 | [−X2, X1] | 12 | −X2 |

In this embodiment, the corresponding relations are stored in the working memory 5 or the storage unit 6 in a data organization which makes it possible to obtain the name of each quadrant with j as a key and the name of each coordinate axis with m as a key and to conversely obtain j with the name of each quadrant as a key and m with the name of each coordinate axis as a key.

Figure 7:
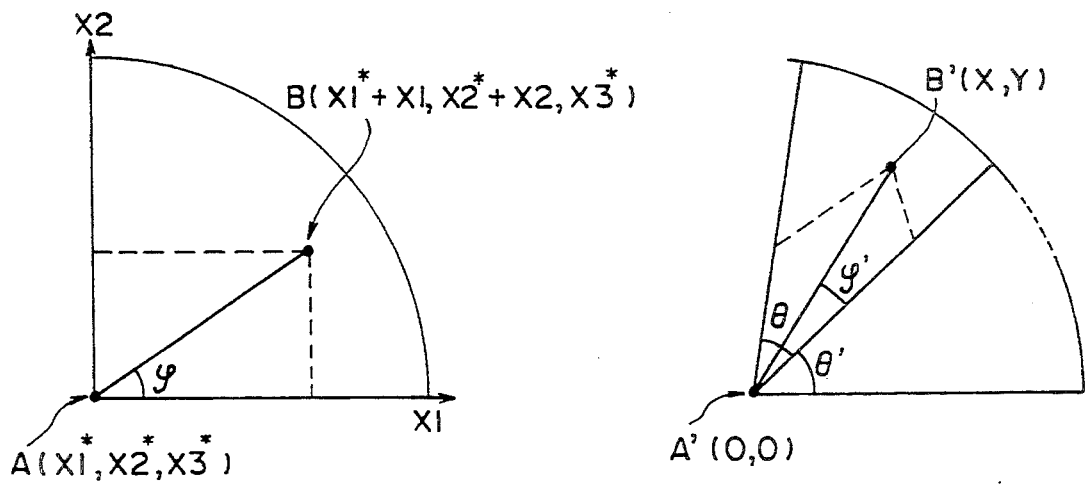
FIG. 7 is a diagram for explaining the correspondence between quadrants and sectors for the multidimensional information display according to the present invention.

An example of the correspondence between a point on the quadrant and a point on the sector will be described with reference to FIG. 7. The example in FIG. 7 is such that one point B on the quadrant [X1, X2] is brought into correspondence with one point B on the i[X1, X2]-th sector. The point B' is a point constituting a contour line. Letting (X1*, X2*, X3*) be the coordinates of the central point A in the three dimensional space, the coordinates of the point B is expressed as (X1*+X1, X2*+X2, X3). This point B can be brought into correspondence with the point B'(X, Y) on the plane by a coordinate transformation indicated in FIG. 7.

Figure 4:
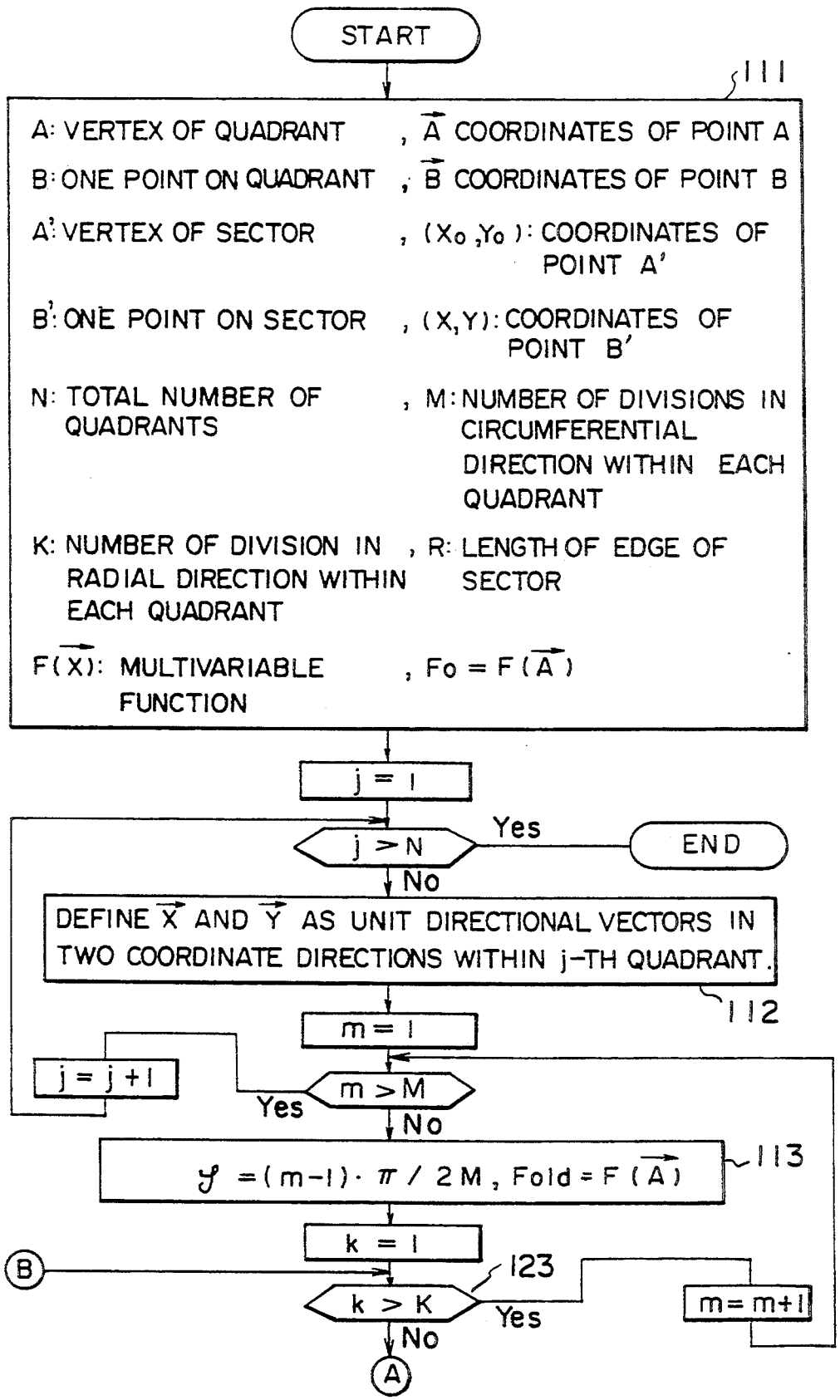
FIGS. 4 and 5 are flow charts showing the details of a step 13 in the flow chart of FIG. 2.
Figure 5:
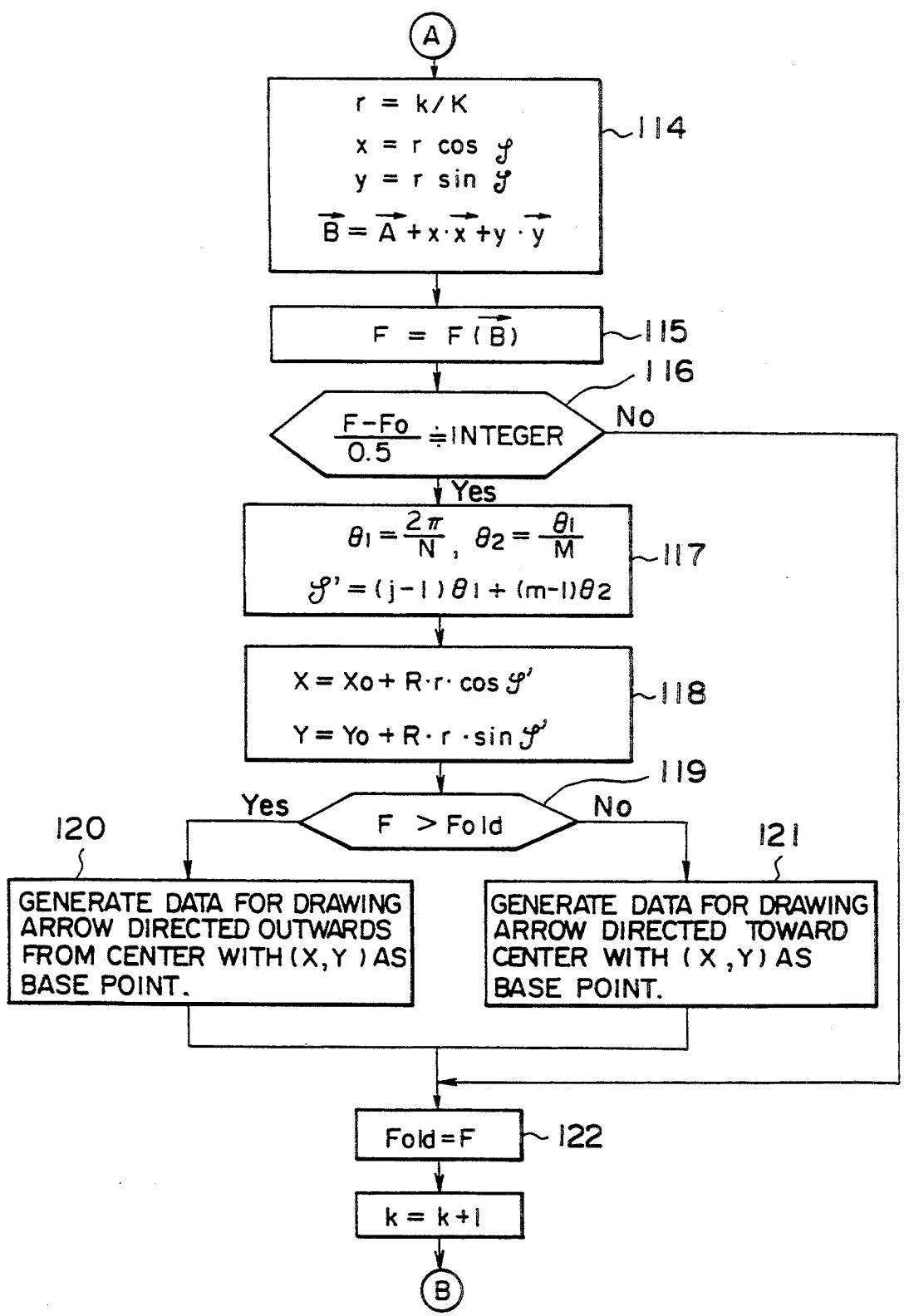

(iii) Step 13:

Herein, the value of the function F at a point existing on each quadrant in the three-dimensional space is indicated at the position of that point on the sector which corresponds to the quadrantal point. The details of this step 13 are shown in FIGS. 4 and 5. At a step 111 in FIG. 4, initial values are set. More specifically, information items mentioned in the block of the step 111 are output from the CPU 4 and are displayed on the output device 1. The information items are kept stored in the storage unit 6. In view of the display on the output device 1, the operator inputs necessary data items among data items concerning the information items of the step 111, except data items already given. The necessary data items are set as the initial values. By the way, symbol Fo denotes the value of the multivariable function at the central point A. Although not included in the information items of the step 111, the radial distance of each quadrant divided by the number of divisions K is also appointed by the operator. A range thus determined is the range which is displayed in the multidimensional-spacially developed view.

Now, it is assumed to set the total number of quadrants, N=12; the number of divisions in the circumferential direction within each quadrant, M=40; and the number of divisions in the radial direction within the same, K=200. Meshes are formed in the quadrant on the basis of the divisional numbers K and M. Subsequently, the process of a step 112 is executed, and the computation of a step 113 is repeated until m>M holds good. Incidentally, "Φ" denotes an angle. At a step 114 in FIG. 5, the coordinates (of, for example, the point B) are given to one of the meshes formed in each quadrant. A formula indicated in the block of a step 115 serves to obtain the value of the multivariable function corresponding to the coordinates. In this way, the values of the function F are computed successively from the central point A toward the circumference on the radii of each quadrant which is equally divided by 40 in the circumferential direction thereof. A step 116 determines whether or not the value of the multivariable function obtained at the step 115 increases (or decreases) as the multiple number of 0.5 with respect to the functional value at the central point A. The value which can be divided by 0.5 without a remainder is used as data for displaying the contour line to be described later. It should be noted that, "0.5" corresponds to the interval of the levels of the contour lines and can be changed into another value. On condition that the decision of the step 116 is "Yes", steps 117 and 118 are executed. The steps 117 and 118 determined the coordinates (X, Y) of a position within the sector in the case where a point within a certain quadrant in the n-dimensional space defined as the domain of the multivariable function is projected on the corresponding sector. The determined coordinates are stored in the working memory 5 or the storage unit 6. The aforementioned points within the certain quadrant in the n-dimensional space are indicated by the coordinates of the position developing that value of the multivariable function which has been decided "Yes" by the step 116. Further, the elementary graphic data for depicting an arrow which has the coordinates (X, Y) as its base point is generated by a step 120 or 121 and is stored in the storage unit 6. Herein, the elementary graphic data of the arrow is generated so that when displayed on the output device 1, the arrow may point in the direction in which the value of the multivariable function increases. The decision of a step 119 is rendered before each of the steps 120 and 121. This decision signifies whether or not the value of the multivariable function obtained at the step 115 is greater than the old value Fold thereof. The step 120 is proceeded to subject to "Yes", whereas the step 121 is proceeded to subject to "No". Thereafter, a step 122 changes the value Fold into the value obtained at the step 115 and shifts to a step 123. Such processing steps are repeated. When j>N holds good, the process of the step 13 is ended.

The above operations are carried out on all the radii of each quadrant which is equally divided in the circumferential direction, thereby generating the graphic data by which the contour lines of the values of the multivariable function in the quadrant are displayed in the sector corresponding to this quadrant. In displaying the contour lines, the CPU 4 successively reads the coordinates of the points in the sector and the elementary graphic data for depicting the arrows at the coordinates, out of the working memory 5 or the storage unit 6, and it sends them to the image data generator 2. Finally, a picture is depicted on the output device 1. Incidentally, since the arrow indicates the direction in which the functional value increases, it may well be replaced with any another index capable of indicating a direction. By way of example, the contour lines can also be indicated in different colors in such a manner that red is used in a case where the functional value increases relative to the contour line which directly precedes outwards from the central point, whereas blue is used in a case where it decreases. Alternatively, numerical values indicating the functional values may well be affixed to the respective contour lines though this measure is inferior in point of immediate recognizability.

Figure 8:
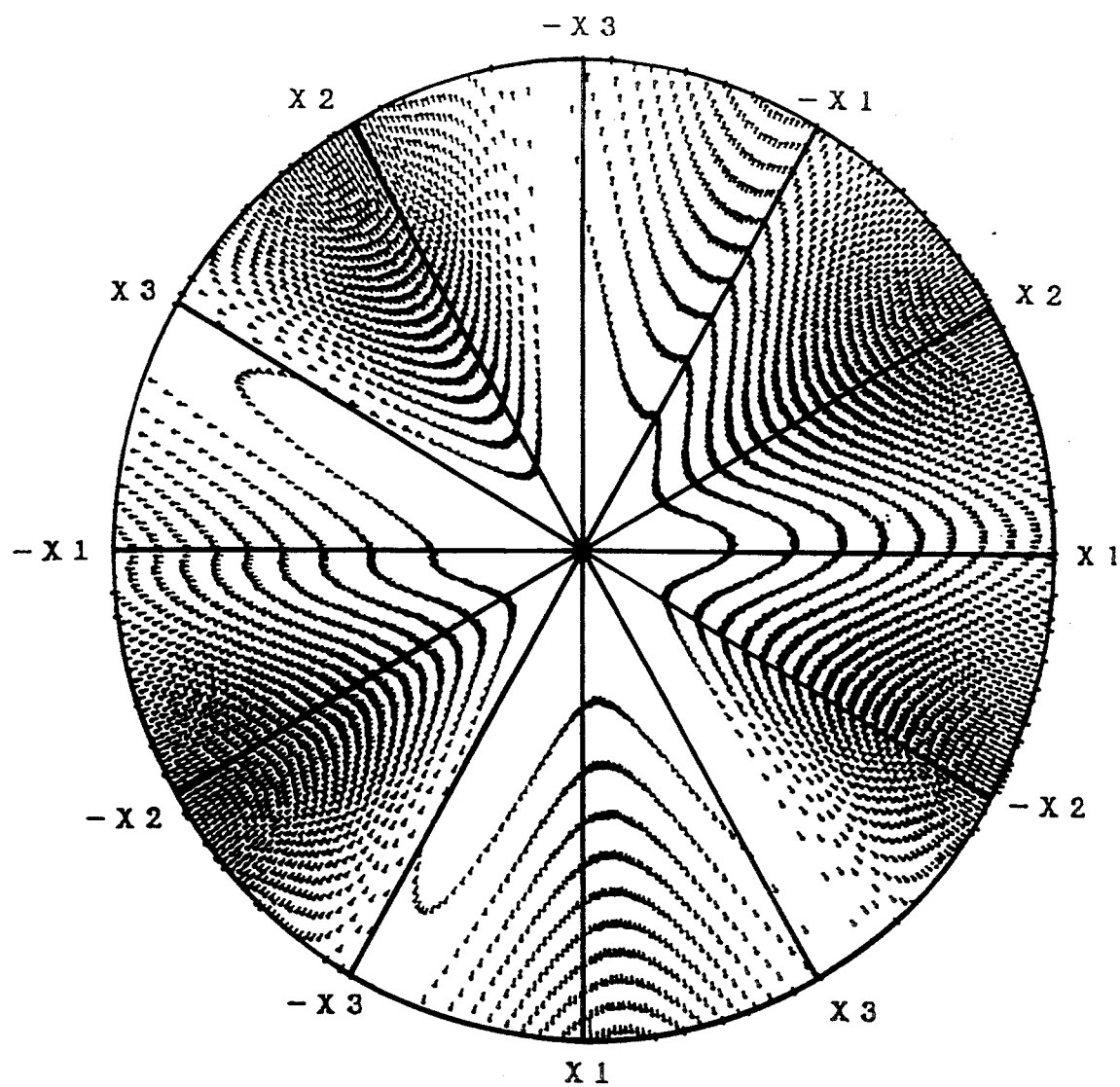
FIG. 8 is a diagram for explaining an example of a multidimensional-spacially developed view according to the present invention.

FIG. 8 shows a multidimensional-spacially developed view which has been generated in accordance with the processing described above, and which expresses the incremental or decremental situation of the values of the multivariable function F within the sphere of radius 1 (unity) having its center at the point A. In the figure, the contour lines are continuous on the side edges of the sectors and form a closed shape surrounding the central point. Further, all the arrows of the contour lines indicate the direction of moving away from the central point.

From these facts, it can be visually acknowledged that the point A being the central point in the multidimensional-spacially developed view is the minimum (least) point of the multivariable function F.

If, in the multidimensional-spacially developed view based on this embodiment, an identical coordinate axis can be brought into correspondence with the side edge shared by the two adjacent sectors and all the sectors corresponding to the quadrants in the multidimensional space can be included, all the contour lines become continuous with the respectively corresponding side edge held therebetween in the exemplified case where the varying situation of the values of the multivariable function is expressed by the contour lines. This is highly effective for intuitively grasping the varying situation of the values of the multivariable function around the central point. This embodiment is characterized in that the coordinate axes are brought into correspondence with the side edges of the sectors so as to fulfill the above requisites. An example in which an idea based on the graph theory is applied to the correspondence will be explained below.

Figure 9:
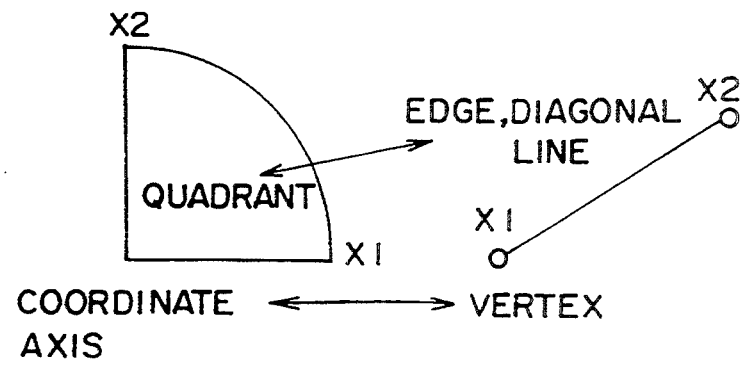
FIG. 9 is a diagram for explaining the principle of modeling the relation between a quadrant and coordinate axes in the multidimensional-spacially developed view according to the present invention.
Figure 10:
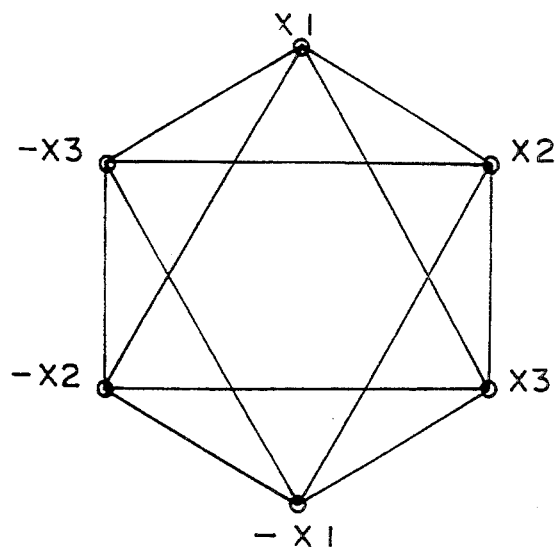
FIG. 10 is a graph for explaining a method of determining the arraying order of quadrants so as to continue the contour lines of the multidimensional spacially developed view according to the present invention.

One quadrant is determined by two coordinate axes. This can analogize with the fact that one segment of a line is determined by two vertices. Accordingly, the relation between the quadrant and the coordinate axes can be expressed by a simple model in which, as shown in FIG. 9, the segment and the vertices are respectively held in correspondence with the quadrant and with the coordinate axes. With such modeling, the relations among quadrants and coordinate axes in a multidimensional space can be expressed as a graph which consists of latera and vertices. FIG. 10 shows a graph which expresses the relations among quadrants and coordinate axes in a three dimensional space. In this graph, the vertex (coordinate axis) X1, for example, makes latera (quadrants) together with the respective vertices (coordinate axes) X2, X3, -X2 and -X3. In the graph of FIG. 10, the relations among all quadrants and coordinate axes can be expressed in the same way. In this graph, two adjacent latera (quadrants) share one vertex (coordinate axis), so that the contour lines become continuous. Accordingly, if a point having started from an arbitrary vertex on this graph can pass through each of the latera once and return to the original vertex, the quadrants can be arrayed so as to continue all the contour lines. The arrayal is nothing but finding the Eulerian closed path on the above graph.

In the graph expressive of the n-dimensional space, the number of vertices (coordinate axes) is 2n. Each of the vertices (coordinate axes) forms latera (quadrants) together with (2n−2) vertices (coordinate axes) which do not include the pertinent vertex itself and the vertex opposite thereto. The total number of latera extending from each vertex is called the "degree". In the graph, the degree of each vertex is (2n−2), which is always an even number irrespective of n. The graph in which the degree of any of the vertices is even, belongs to the Euler graph. It is guaranteed for the Euler graph to be depicted by one stroke of a pen without fail. Accordingly, the graph mentioned before can be depicted by one stroke. In other words, it is guaranteed that all the quadrants can be arrayed so as to continue the contour lines, anytime without regard to n.

An algorithm for obtaining the Eulerian closed path is stated in, for example, "Introduction to Combinatorial Mathematics, II" written by C. L. Liu, translated by Masao Iri and Yumi Iri, pp. 191–192, Kyoritsu Zensho (1972).

In this embodiment, the arrayal of the quadrants making the contour lines continuous is determined on the basis of the technique as described above, thereby generating the multidimensional spacially developed view with which the user can easily intuitively grasping the quadrantal situation of the values of the function around the central point.

Although, in this embodiment, the incremental or decremental situation of the values of the multivariable function has been expressed using the contour lines, any means of expression can be applied to the present invention as long as it permits the visual grasp of the varying situation of the function values. By way of example, the gradation level of a color for displaying the functional values may well be changed in accordance with the magnitude of the functional values. In this case, all the computed functional values can be displayed unlike the foregoing contour line display of the functional values at the points where they are interval fixed values. Alternatively, it is possible to adopt a technique capable of displaying the rugged state of the surface of an object in three dimensions, such as a three dimensional mesh diagram or a bird's-eye view. The display on the output device having a planar display screen has been supposed for any of the displaying expedients mentioned above. However, a stereoscopic display will be also possible if display means capable of displaying the rugged state of the surface stereoscopically is available.

Now, an embodiment will be described in view of a case where the multidimensional information displaying program shown in FIG. 2 is applied to a nonlinear optimization apparatus. Such a nonlinear optimization apparatus is disclosed in U.S. patent application Ser. No. 579,476 (filed: Sep. 7, 1990) entitled "Method and apparatus for computer controlled nonlinear optimization". The embodiment of the present invention illustrated in FIG. 2 is applicable to each of the embodiments in the above-identified patent application. At this time, the multivariable function is used as the objective function of a nonlinear optimization problem. The objective function can be solved using a nonlinear optimization method, and the optimum solution (least value) can be found. After the optimum solution has been obtained, the processing based on the multidimensional information displaying program shown in FIG. 2 is executed to display the varying state of the values of the multivariable function centering round, and in the vicinity of, one point (a position where the optimum solution is obtained) in the multidimensional space defined by the multivariable function.

FIG. 11 shows a multidimensional information displaying apparatus which adopts the multidimensional information displaying method in FIG. 2. The user affords the data items for determining the coordinates of the central point A, as inputs with an input device 8. The input data items are sent to a working memory 5 through an input buffer 7. A storage unit 6 stores therein the formula of the multivariable function, the coordinates of the present central point A, the multidimensional information displaying program, a program for renewing the coordinates of the central point A, etc. First, in order to renew the coordinates of the central point A, a CPU 4 calls the coordinate renewing program from the storage unit 6 into the working memory 5 and executes it, thereby generating the coordinates of the new central point on the basis of the data items input by the user. Subsequently, the CPU 4 calls the formula of the multivariable function and the multidimensional information displaying program from the storage unit 6 into the working memory 5 and executes them, thereby performing the processing as described before on the basis of the coordinates of the new central point and generating the elementary data for depicting the graph as shown in FIG. 8. The generated data is sent to a image data generator 2 through an output buffer 3, and the graph is depicted on an output device 1.

According to this embodiment, the varying state of the values of the multivariable function around the arbitrary position in the multidimensional space can be grasped on the basis of the appointment by the operator.

The multidimensional information displaying apparatus shown in FIG. 11 can be applied to the nonlinear optimization apparatus, and can be utilized for verifying the result of a nonlinear optimization computation. Hereinbelow, the "nonlinear optimization" shall signify the minimization of the multivariable function. As a plain explanation, the optimizing computation based on mathematical programming is intended to obtain the coordinates of that point in the multidimensional space at which the gradient of the function becomes 0 (zero). Therefore, the result of the nonlinear optimization computation is not guaranteed to be the least point in the significance of a large region, and it is sometimes a local least point (minimum point) or a saddle point. With the multidimensional information display according to this embodiment, whether coordinates obtained as the result of the nonlinear optimization computation denote the least point or the saddle point can be visually judged with ease. Moreover, whether or not another least point being still better exists near the present central point A can be known by enlarging that region in the multidimensional space which is to be displayed in the multidimensional-spacially developed view.

In the case of enlarging the region of the multi dimensional space which is to be displayed in the multidimensional-spacially developed view, the elementary graphic data of the multidimensional spacially developed view can be generated in the following way: The radial distance of the quadrant to be appointed at the step 111 in the embodiment of FIG. 2 is made greater than the present value, whereby the region of the multi-dimensional space to be displayed in the developed view is enlarged. On this occasion, the value "0.5" stipulating the levels of the contour lines as indicated at the step 116 in FIG. 5 can be changed into a different value (for example, "1.0") by the operator. This can be prevent the contour lines from being densely depicted due to the regional enlargement.

Figure 13:
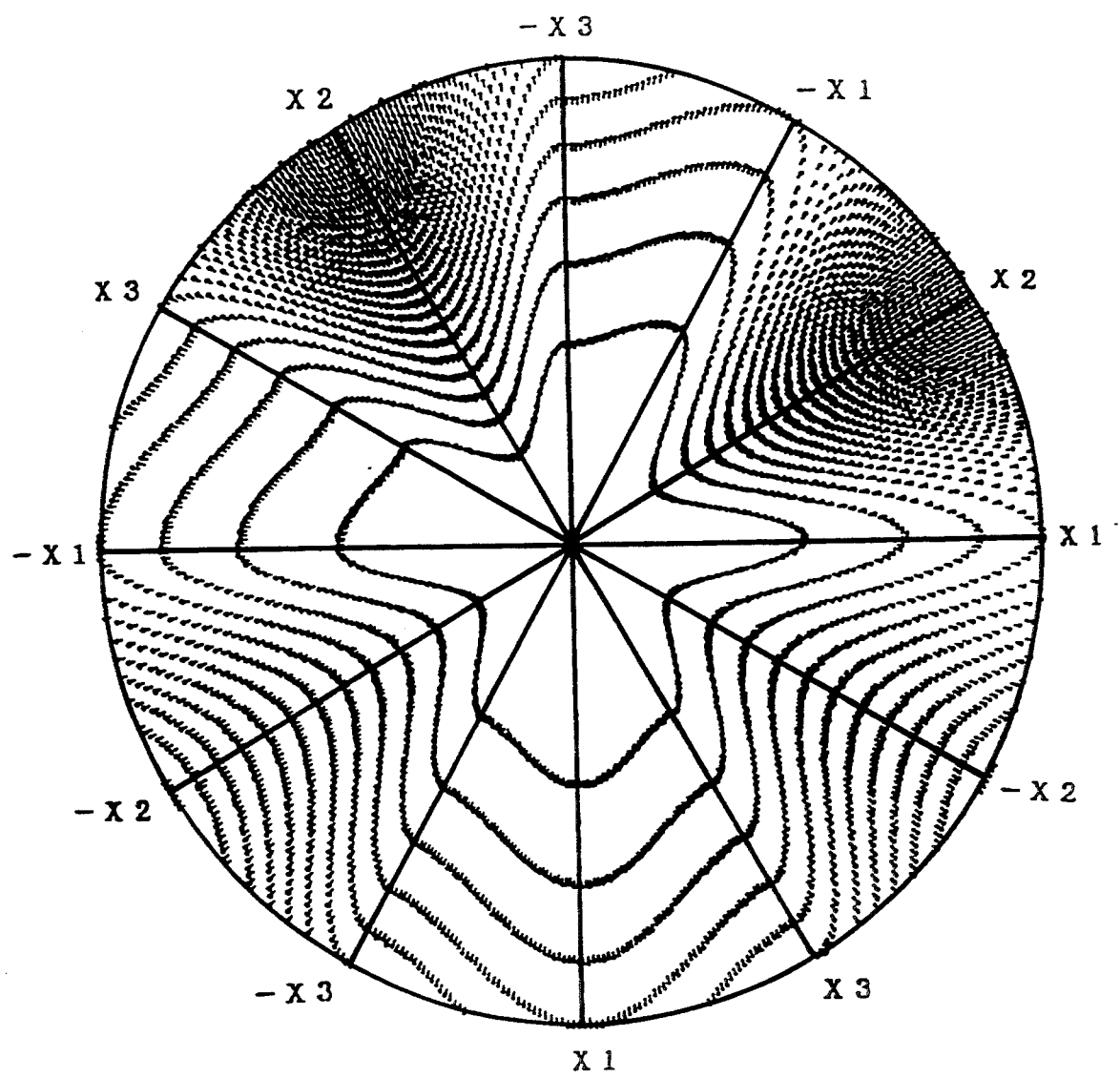
FIG. 13 a diagram for explaining still another example of the multidimensional-spacially developed view according to the present invention.
Figure 14:
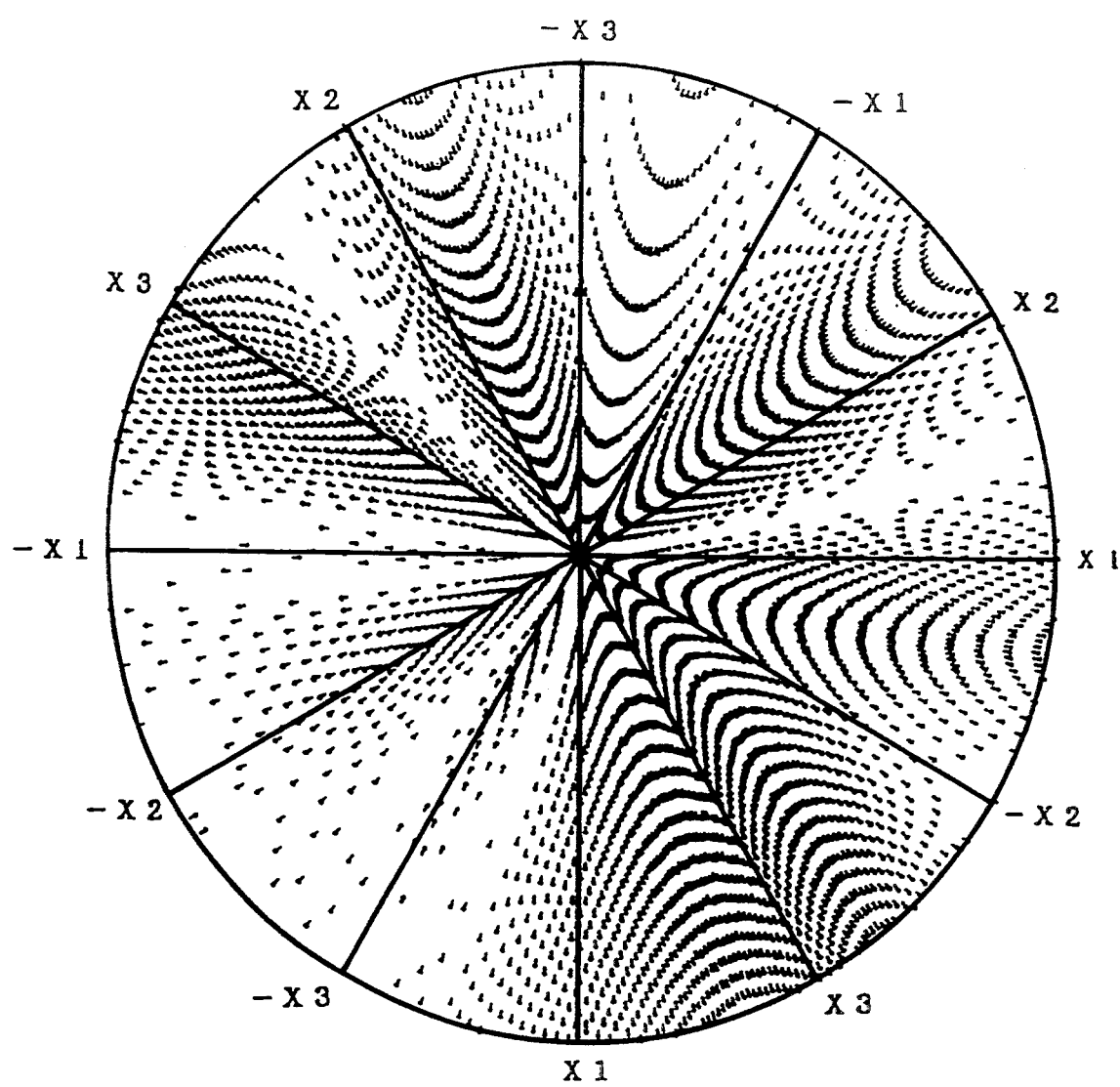
FIG. 14 is a diagram for explaining yet another example of the multidimensional-spacially developed view according to the present invention.
Figure 15:
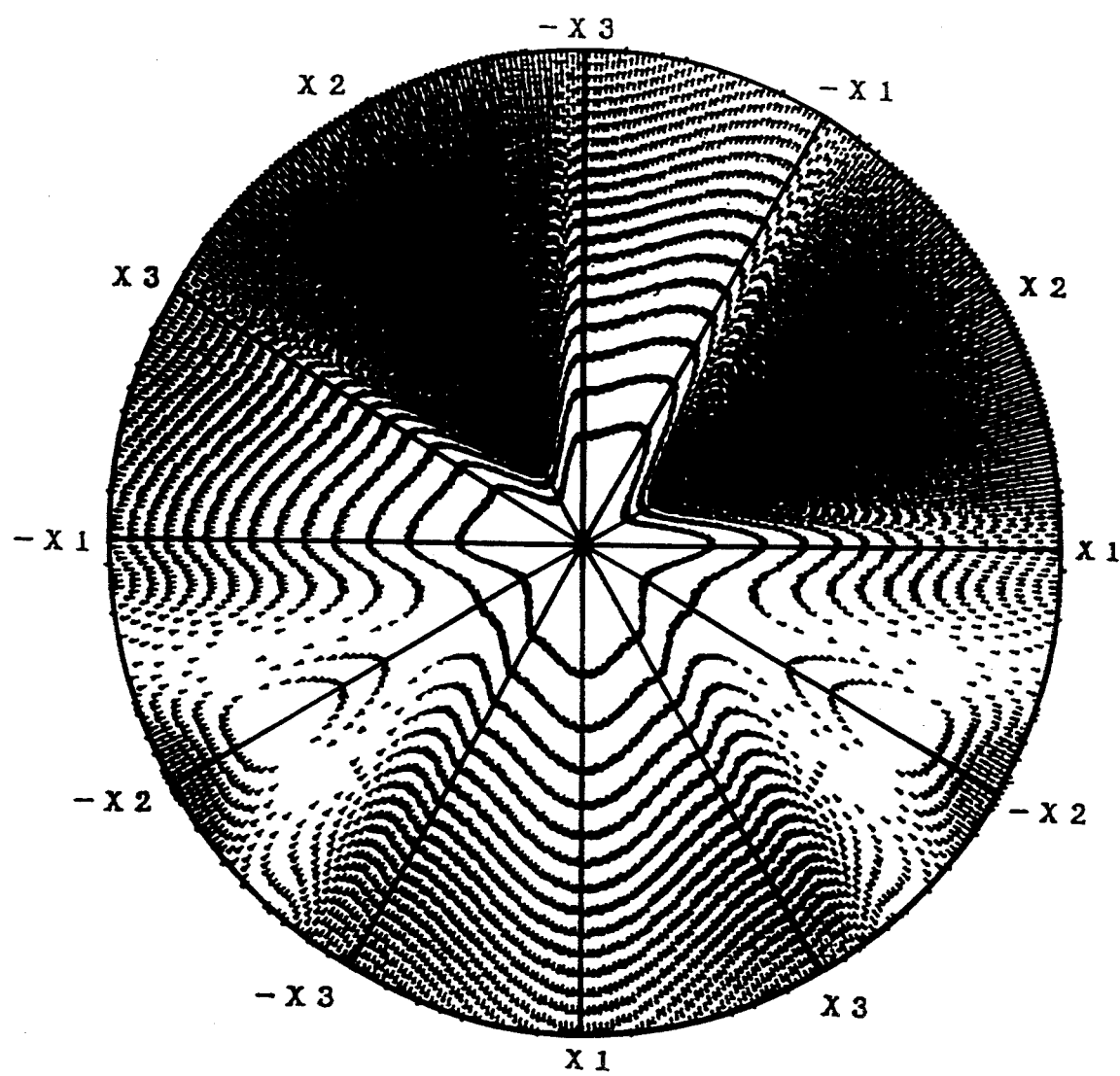
FIG. 15 is a diagram for explaining a further example of the multidimensional-spacially developed view according to the present invention.

Now, how the saddle point, the least point, etc. are displayed will be explained with respect to a three-variable function different from the foregoing:

$$f = 2 \cdot X1^2 + 0.5 \cdot (X2^2 - 1) \cdot (X2^2 - 9) + 3 \cdot X3^2$$

and with reference to specific multidimensional-spacially developed views in FIGS. 12–15. Herein, FIGS. 12–14 have been drawn by setting the radius of a circle (the range of values which each of the variables $X1$, $X2$ and $X3$ can take) at 1.0 and the intervals of contour lines at 0.5 and by making the positions of central points different from one another. FIG. 15 has been drawn under the same conditions as those of FIG. 13 except that the radius of a circle is enlarged to 6.0.

When the conclusion is stated first, this function f has its least point at coordinates $(X1, X2, X3) = (0.0, \pm 2.236, 0.0)$ and its saddle point at coordinates $(0.0, 0.0, 0.0)$. Since $\partial f/\partial X1 = \partial f/\partial X2 = \partial f/\partial X3 = 0$ holds at the saddle point, the optimizing program misrecognizes this point as the least point. The multidimensional-spacially developed view in FIG. 12 centers round the coordinates $(0.0, 0.0, 0.0)$. Even when the nonlinear optimization program has misrecognized the central point as the least point, it can be recognized at a glance from FIG. 12 that the central point is the saddle point, not the least point. More specifically, from the broad intervals of the contour lines near the central point, it is understood that the gradient of the function is gentle near the central point. However, the contour lines are not closed around the central point, and arrows directed centrally coexist with arrows directed outwards. It is therefore recognized that the central point is the saddle point.

On the other hand, when the multidimensional spacially developed view of FIG. 13 having its central point at the coordinates (0.0, ±2.236, 0.0) is observed, the contour lines are closed around the central point, and all arrows are directed outwards. It is therefore understood that the central point here is the least point. FIG. 14 is the developed view drawn around an apt point (1.0, 1.0, 1.0) which is neither the least point nor the saddle point. From this view, it is visually recognized that the contour lines mix in confused and complicated manner and that the central point does not lie at a stable position.

As stated before, the developed view of FIG. 15 centers around the same least point as in FIG. 13, but it has enlarged the radius of the circle in FIG. 13. Owing to the enlargement, the varying situation of the functional values can be grasped over a larger range. According to the view of FIG. 15, it is understood that another least point exists at a position which is about 5 distant in the direction of an axis -X2 from the central point. The least point cannot be recognized from the developed view of FIG. 13. By the way, the coordinates of the newly found least point are (0.0, −2.236, 0.0) exactly.

Figure 16:
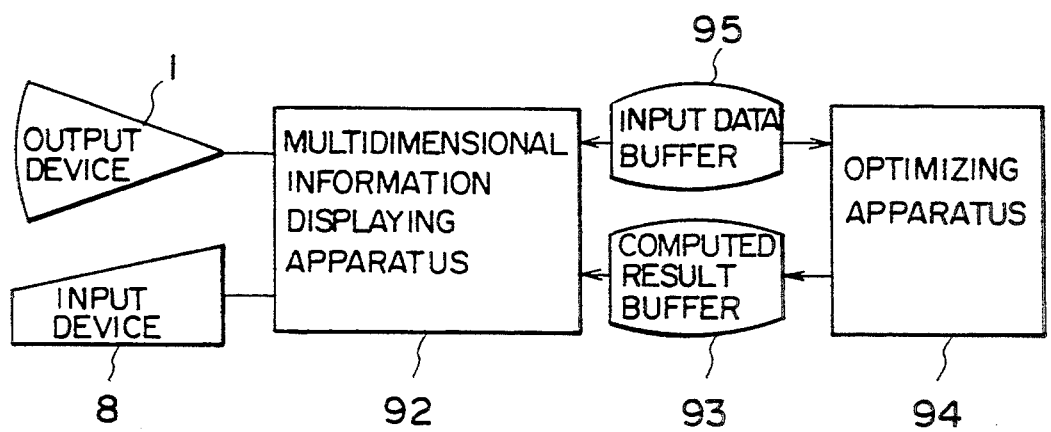
FIG. 16 is a block diagram showing an embodiment of a nonlinear optimization system in which the multidimensional information displaying apparatus according to the present invention is employed as an apparatus for verifying the result of an optimizing computation.

FIG. 16 shows the architecture of an embodiment of a nonlinear optimization system in which the multidimensional information displaying apparatus according to the present invention is adopted as an apparatus for verifying the result of an optimizing computation. This system includes an output device 1, an input device 8, the multidimensional information displaying apparatus 92, a buffer 93 which stores the result of the nonlinear optimization computation containing the coordinates of the optimum point, an optimizing apparatus 94, and a buffer 95 which stores input data for the nonlinear optimization computation containing the formula of an objective function (multivariable function) and various initial values. The reliability of the result of the optimizing computation can be enhanced by employing the multidimensional information displaying apparatus 92 in order to verify the optimal computed result of the optimizing apparatus 94.

Besides, the multidimensional information displaying apparatus in the present invention can be adopted as a nonlinear optimization apparatus of the interactive type for a multivariable function. More specifically, the user visually grasps the incremental and decremental directions of functional values by reference to a multidimensional spacial developed view displayed, and determines a direction in which the present central point is to be moved. The coordinates of a new central point are generated by inputting the determined direction, and the varying situation of the values of the multivariable function around the new central point is expressed as a multidimensional spacially developed view by using the multidimensional information displaying method of the present invention again (the embodiment in FIG. 11, for example, may be employed). By repeating the above operations, the coordinates of a central point meeting desired conditions can be finally obtained in an interactive fashion.

Here, let's consider a practical example in which the multidimensional information displaying method according to the present invention is applied to the optimum control of any system.

Figure 17:
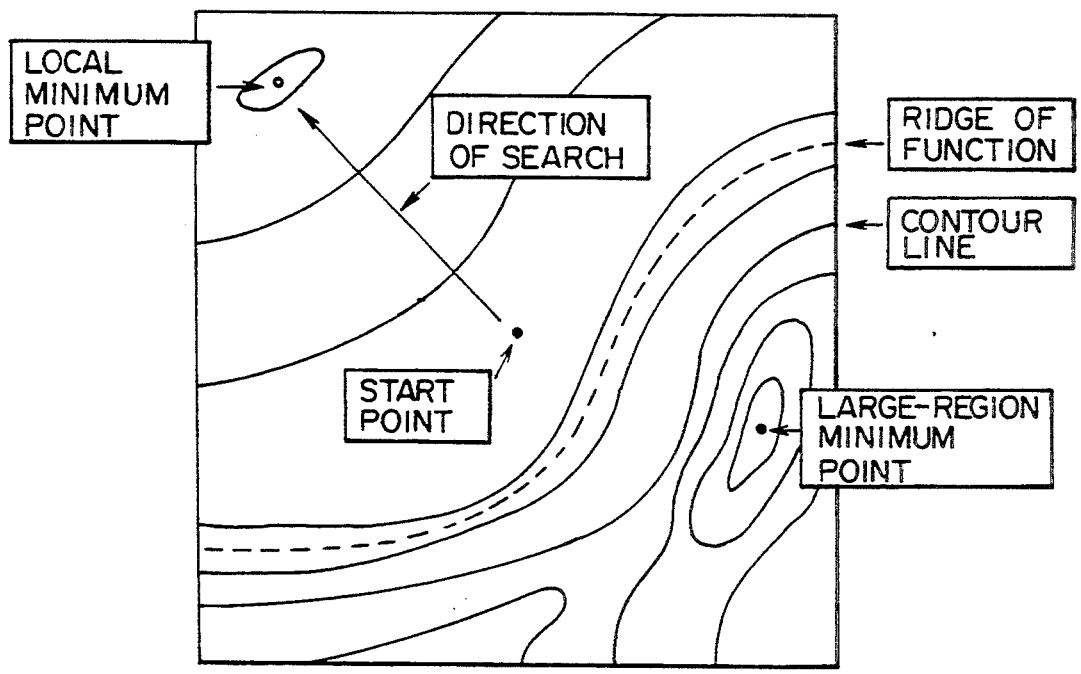
FIG. 17 is a diagram for explaining drawbacks which are involved in an optimum control system.

Now, a system S whose output value is determined depending upon a plurality of input parameters will be referred to. Particular concrete examples of the system S are mechanical systems such as an engine or a motor, an energy system represented by a power plant, a production system represented by a chemical plant, an economic system such as portfolio, and so forth. Regarding such a system, it is assumed that, when the set of the input parameters is denoted by $P(X1, X2, \ldots, Xn)$, the output value F of the system can be modeled and expressed in terms of a function $F(P)$. The control of the system aims at, e. g., maximizing or minimizing the output value F or holding it at a specified value. Herein, the case where the maximization of the value F is aimed at shall be explained. A specific example of such a problem is the problem of the control of a chemical plant. That is, it is the aim of the control to maximize a production quantity per unit time under restrictive conditions given. In general, the problem of this sort is a nonlinear optimization problem of a multipeaked nature. In this regard, a technique for numerical nonlinear optimization can afford only local optimum points and is therefore insufficient for achieving the aim of the control. In addition, a nonlinear optimization technique which evaluates the optimum point on the basis of the first differential coefficient of an objective function has the drawback that the optimum point and saddle point of the objective function cannot be distinguished as numerical values. Further, in a case where the input parameters are to be set near certain specified values and where the contour lines of the objective function are as shown in FIG. 17, the numerical optimization technique in the prior art begins a search at a start point which is a point corresponding to the specified values. Even when the minimum point has been found, it is sometimes a local minimum point distant from the start point, not a large region minimum point. That is, with the prior art technique, the local minimum point is sometimes output as the final solution.

Such drawbacks can be eliminated by the use of the multidimensional information displaying apparatus according to the present invention.

Figure 18:
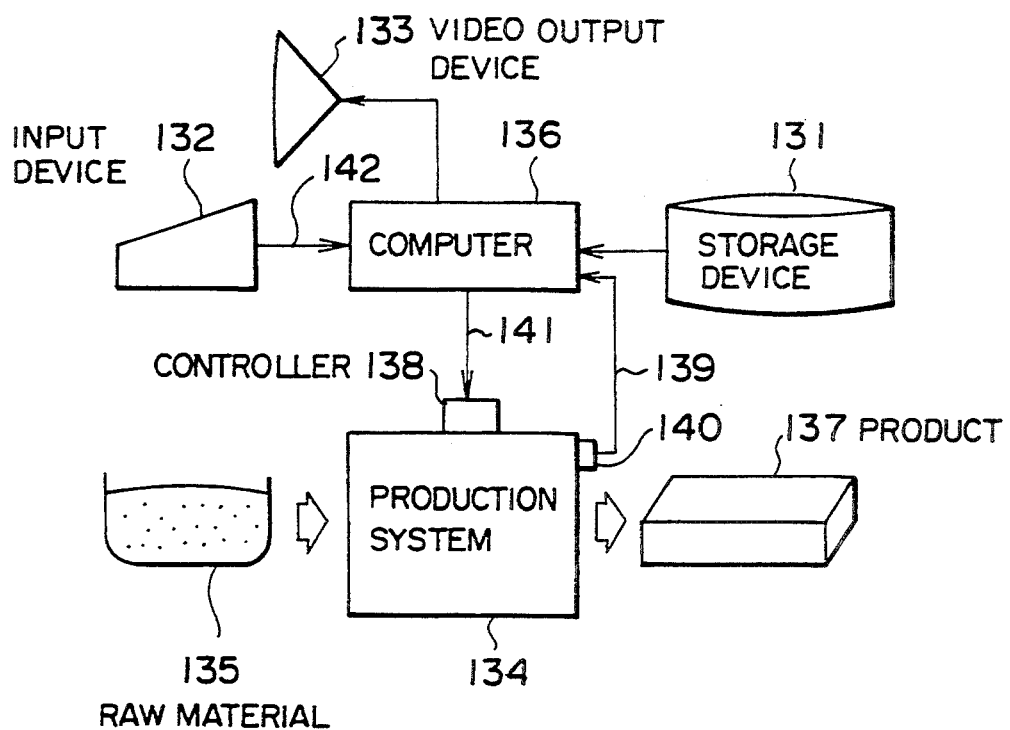
FIG. 18 is a block diagram showing an embodiment of a production system which utilizes the multi dimensional information displaying apparatus according to the present invention.

FIG. 18 shows the construction of an embodiment of a production system furnished with the multidimensional information displaying apparatus of the present invention as a control parameter determining equipment. The production system 134 has processing installations and transporting installations which are necessary for producing a product 137 from a raw material 135. Although only one kind of raw material 135 is illustrated in the figure, actually there may well be a plurality of materials. The transporting installations carry the raw material 135 and an intermediate product between the processing installations. The production system 134 has a controller 138 for controlling the operations of all the installations. The controller 138 is a host computer, and dedicated controllers (local controllers not shown) are separately provided for the respective processing and transporting installations. The local controllers control the corresponding processing and transporting installations in charge, under the control of the controller 138. In the production system 134, under the restrictions of the capabilities of the constituent processing and transporting installations, the individual installations need to operate so as to maximize that quantity of the product 137 which is produced from the raw material 135 per unit time. To this end, the controller 138 and the local controllers control parameters 141 for controlling the individual installations. The controlling parameters 141 for the optimum controls of the installations are determined by a computer 136 which operates as the control parameter determining equipment being a nonlinear optimization processor. In this embodiment, the computer 136 functions also as the multidimensional information displaying apparatus of the present invention. The computer 136 as the control parameter determining equipment is supplied with parameters 142 which are afforded as inputs from an input device 132, and feedback parameters 139 which are the measured values of detectors 140 disposed in correspondence with the installations of the production system 134. The detectors 140 measure the data representing the operating states of the corresponding installations. The input parameters 142 are information items on the operation of the production system 134, that is, the information of the raw material 135 to be fed, the restrictive conditions of the production system 134 (for example, restrictive conditions concerning the capabilities of the individual installations), the operational restrictive conditions of the production system 134 (for example, the electric energy of the production system), etc., and they form a mathematical formula model. The mathematical formula model is a problem which is given to the control parameter determining equipment 136 in order to find the optimum control parameters 141. The optimum control parameters 141 obtained by the control parameter determining equipment 136 are input to the controller 138. On the basis of the controlling parameters 141 received as the inputs, the controller 138 sends the respective local controllers control signals for controlling the corresponding installations. The feedback parameters 139 are input to the control parameter determining equipment 136, and are thus accepted into the mathematic formula model stated above. Accordingly, nonlinear optimization processing with the feedback parameters 139 taken into account is performed.

As an expedient for assisting the nonlinear optimization processing, the multidimensional information displaying apparatus (computer 136) according to the present invention delivers the multidimensional spacially developed view (multidimensional space graph) explained in the embodiment of FIG. 1, to a video output device 133 on the basis of the multidimensional information displaying program stored in a storage device 131, the mathematical formula model of the system, and such information items as the set of found control parameters (corresponding to the coordinates of the central point) and the radius of the vicinity. For the set of the control parameters, the control parameters 141 found in the computer 136 may be used as they are, or parameters may well be separately input from the input device 132. The user determines the next control parameters 141 of the system 134 on the basis of the multidimensional spacially developed view and gives them to the system 134. In accordance with the control parameters, the system 134 determines the feed quantity of the raw material 135 and controls the quantity of the product 137 as stated before.

By way of example, let's consider a case where the quantity of production F of the system whose operation is determined by three parameters (X1, X2, X3) can be modeled by the following objective function (multivariable function):

$$F=2 \cdot X1^2 + 0.5 \cdot (X2^2-1) \cdot (X2^2-9) + 3 \cdot X3^2$$

Figure 19:
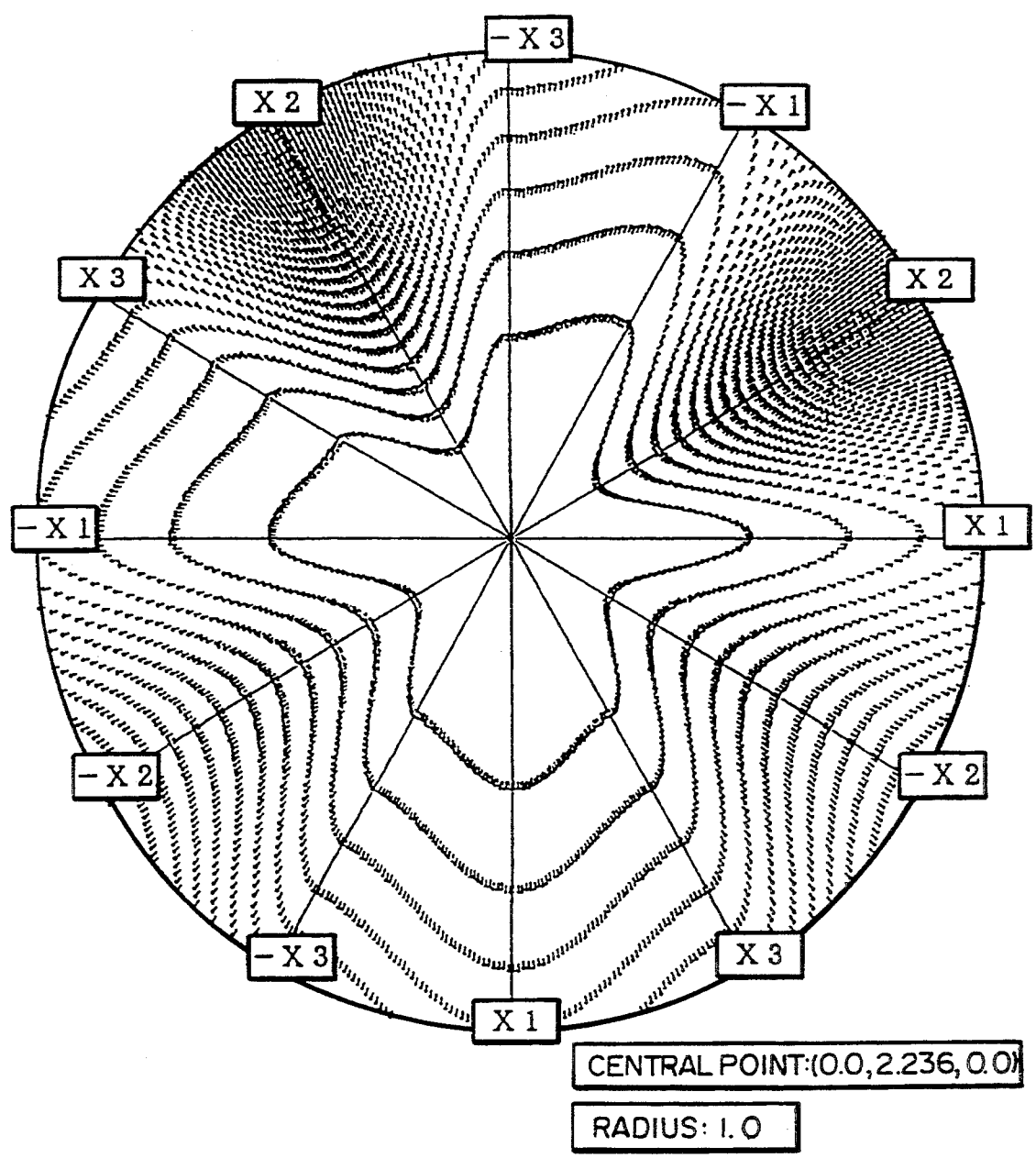
FIG. 19 is a multidimensional-spacially developed view for explaining the system illustrated in FIG. 18.

It is now assumed that a solution (0.0, 2.236, 0.0) has been obtained as the result of the nonlinear optimization computation of the computer 136. A multidimensional-spacially developed view which expresses the range of radius 1 (unity) having its central point at the point of the solution, is shown in FIG. 19. In the figure, arrows representing the contour lines of the function point in the decremental directions of the function. In this example of application, the contour lines are closed around the central point, and the function decreases as it comes away from the central point. It is therefore understood that the central point is one of the maximum points.

Figure 20:
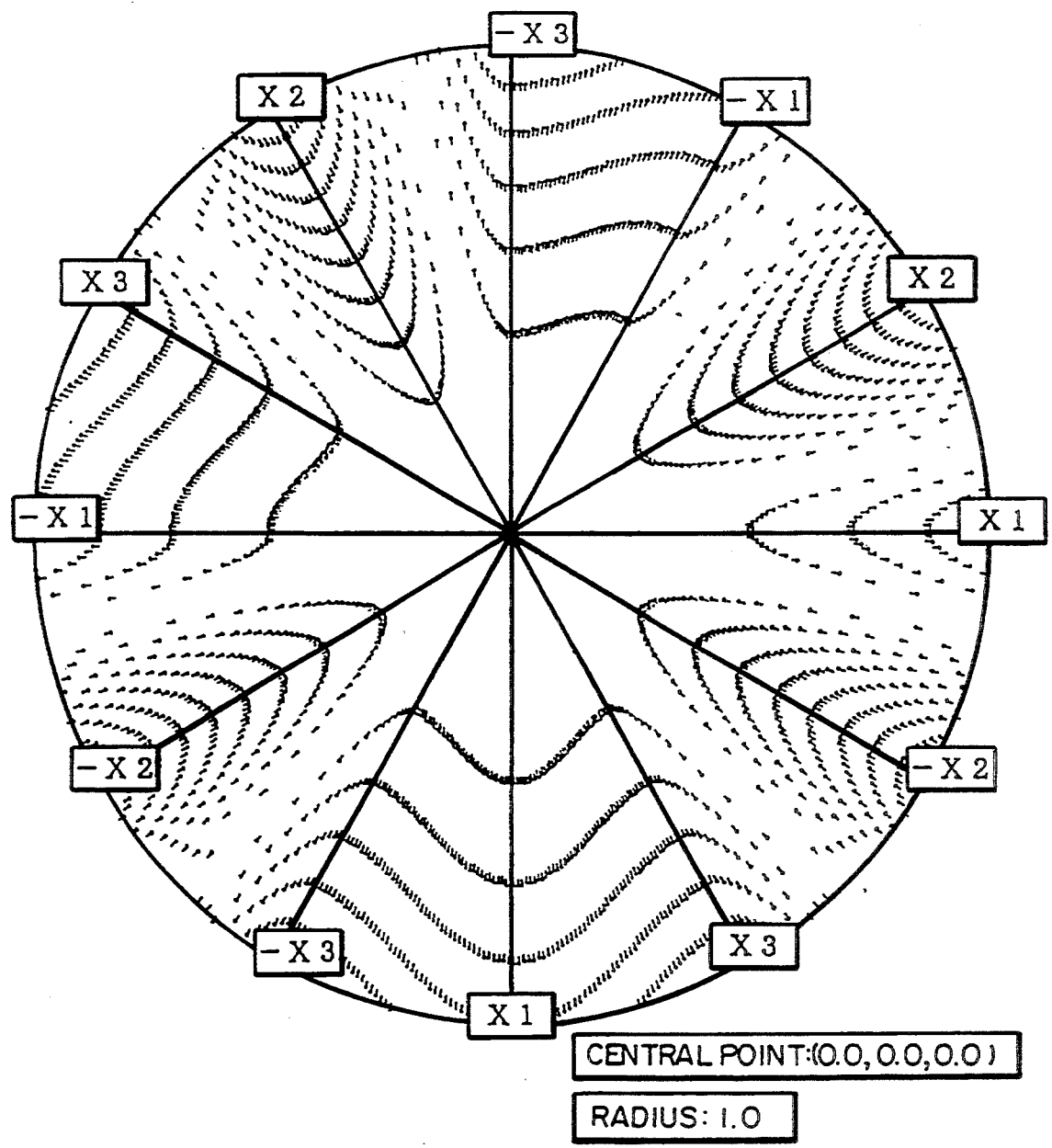
FIG. 20 is another multidimensional-spacially developed view for explaining the system illustrated in FIG. 18.
Figure 21:
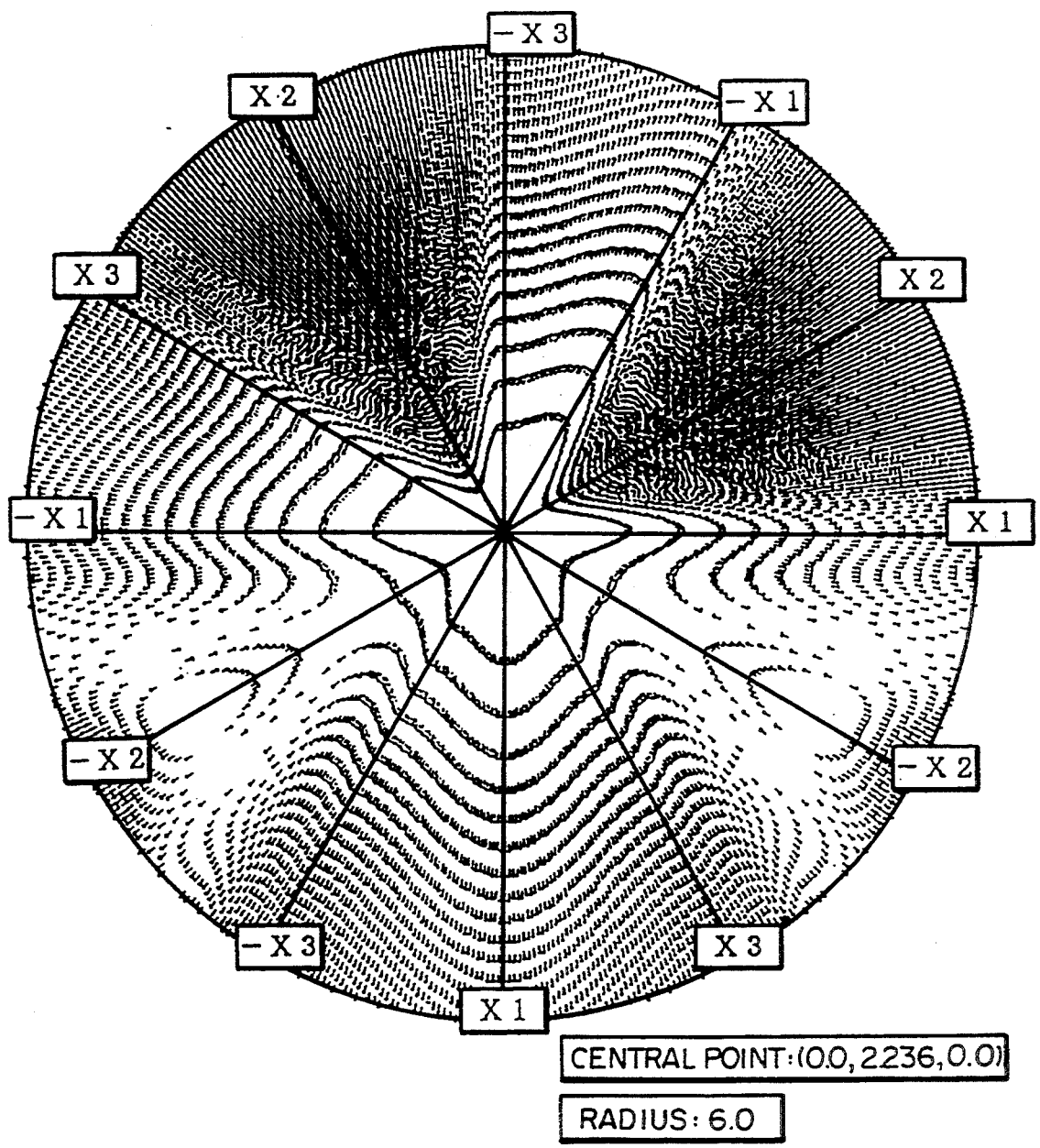
FIG. 21 is still another multidimensional-spacially developed view for explaining the system illustrated in FIG. 18.

Further, it is assumed that a solution (0.0, 0.0, 0.0) has been obtained as the result of another nonlinear optimization computation. A multidimensional-spacially developed view whose central point is the point of the solution, is shown in FIG. 20. In this figure, the contour lines of the function are not closed around the central point, and some of the arrows of the contour lines are directed toward the central point. From these facts, it is visually grasped that the solution does not indicate the maximum point, but that it indicates a saddle point. FIG. 21 shows a multidimensional-spacially developed view which expresses the range of radius 6 having its central point at the point of the solution in FIG. 19. From this figure, it is grasped that another maximum solution exists in a place which is distant about 5 from the central point in a direction—X2. The coordinates of the place are (0.0, 2.236, 0.0) exactly.

As described above, the multidimensional spacially developed views can be used for analyzing the behaviors of the model of the system and for determining the appropriate values of the control parameters.

Although the production system has been referred to in this example of application, the present invention is generally applicable to the nonlinear optimization in which, when an output variable is expressed as the nonlinear function of a plurality of input variables, the input variables affording the minimum value (or maximum value) of the output variable are evaluated. In the control of, for example, a plant, an equipment or an apparatus, it is possible to find that combination of the values of a plurality of input controlled variables which minimizes an output variable expressive of a controlled result. Besides, in a system whose profit (throughput) is determined depending upon the projection rates of a plurality of resources, that allocation of the resources which maximizes the profit can be found. The invention can be utilized also for the computer controls of monetary operations as in a security market.

In addition, the present invention is utilizable for computer-aided design (CAD) systems for the nonlinear optimum designs of a machine (element), etc. In the design of a coil exemplifying the CAD system which has a nonlinear optimization processor; the radius of wire for the coil, the number of turns of the coil and the radius of each arm must be selected in conformity with the restrictive condition that the deformation of the coil does not exceed a predetermined value under a given load. The present invention can be utilized for optimizing the parameters of the coil within a range within which the restrictive condition is satisfied. As another example, in a case where a shaft is required to rotate reliably with the least friction, the present invention is applicable to the CAD system which designs bearings for supporting the shaft.

What is claimed is:

1. In a system whose throughput is determined depending upon projection rates of a plurality of resources, an optimal resource allocation system, comprising:
    a means for expressing said throughput in terms of a multivariable function such that an output variable thereof corresponds to said throughput and has a value determined depending upon a plurality of input variables which correspond to said projection rates of said plurality of resources;
    a multivariable function optimizing system which maximizes the value of said output variable of said multivariable function, comprising:
        an input means for appointing coordinates of an arbitrary point in a multidimensional space which correspond to a domain defined by said input variables;
        a storage device which stores a program for generating image data, a formula of said multivariable function, and the coordinates of said arbitrary point in said multidimensional space;
        said program serving to display a varying situation of the value of said output variable of said multivariable function at a plurality of points around said arbitrary point existent in said multidimensional space, in such a way that a display plane is divided into a plurality of regions, that said plurality of regions are brought into correspondence with a plurality of quadrants which have said arbitrary point in said multidimensional space as a common vertex thereof, respectively, and that the value of said output variable at points on each of the quadrants existent around said arbitrary point are displayed at positions on the respective region on said display plane, said positions corresponding to the points on said each of the quadrants;
        a central processing unit which executes said program to generate the image dam;
        an image output device which displays a picture on a basis of the generated image data such that the varying situation of the value of said output variable of said multidimensional space centering about said arbitrary point is displayed; and
        a means for interactively changing said arbitrary point while observing said picture changing on the display plane so as to find an optimal point on which the value of said output variable is maximum; and
    a means for outputting that allocation of said resources which maximizes said throughput, on the basis of a result of the optimization.

2. An optimal resource allocation system according to claim 1, wherein said display plane is divided into said plurality of regions by a plurality of lines which stretch radially from a point on the display plane.

3. An optimal resource allocation system according to claim 1, wherein the display of the values of said output variable of said multivariable function is presented by displaying indices at positions on the display plane which correspond to points in the multidimensional space at which the values of said output variable are particular values separated at regular intervals.

4. An optimal resource allocation system according to claim 3, wherein each of said indices is an arrow which indicates a varying direction of the value of said output variable at that position on the display plane.

5. An optimal resource allocation system according to claim 1, wherein the display of the values of the output variable of said multivariable function is presented by changing a display color in accordance with a magnitude of said value of the output variable.

6. An optimal resource allocation system according to claim 1, wherein the correspondence between said regions and said quadrants is so established that the two regions which correspond respectively to the two quadrants sharing an identical axis in said multidimensional space adjoin each other.

7. An optimal resource allocation system according to claim 6, wherein the correspondence between said regions and said quadrants is established on the basis of an algorithm for obtaining an Eulerian closed path.

8. In a system in which a value of an output variable is determined depending upon values of a plurality of input variables relating to volumes of resources applied in the system, an optimal resource allocation system, comprising:
    a means for expressing said output variable in terms of a multivariable function;
    a multivariable function optimizing system which optimizes the value of said output variable of said multivariable function, including:
        an input means for appointing coordinates of an arbitrary point in a multidimensional space which correspond to a domain defined by said input variables;
        a storage device which stores a program for generating image data, a formula of said multivariable function, and the coordinates of said arbitrary point in said multidimensional space;
        said program serving to display a varying situation of the value of said output variable of said multivariable function at a plurality of points around said arbitrary point existent in said multidimensional space, in such a way that a display plane is divided into a plurality of regions, that said plurality of regions are brought into correspondence with a plurality of quadrants which have said arbitrary point in said multidimensional space as a common vertex thereof, respectively, and that the value of said output variable at points on each of the quadrants existent around said arbitrary point are displayed at positions on the respective region on said display plane, said positions corresponding to the points on said each of the quadrants;
        a central processing unit which executes said program to generate the image data;
        an image output device which displays a picture on the basis of the generated image data such that the varying situation of the value of said output variable of said multidimensional space centering about said arbitrary point is displayed; and
        a means for interactively changing said arbitrary point while observing said picture changing on the display plane, so as to find an optimal point on which the value of said output variable is optimized; and
    a means for outputting that allocation of said resources which optimizes the value of said output variable, on the basis of a result of the optimization.

9. An optimal resource allocation system according to claim 8, wherein said optimization includes one of maximizing, minimizing and keeping at a specified value, the value of said output variable.

* * * * *